United States Patent Office 2,899,856
Patented Aug. 18, 1959

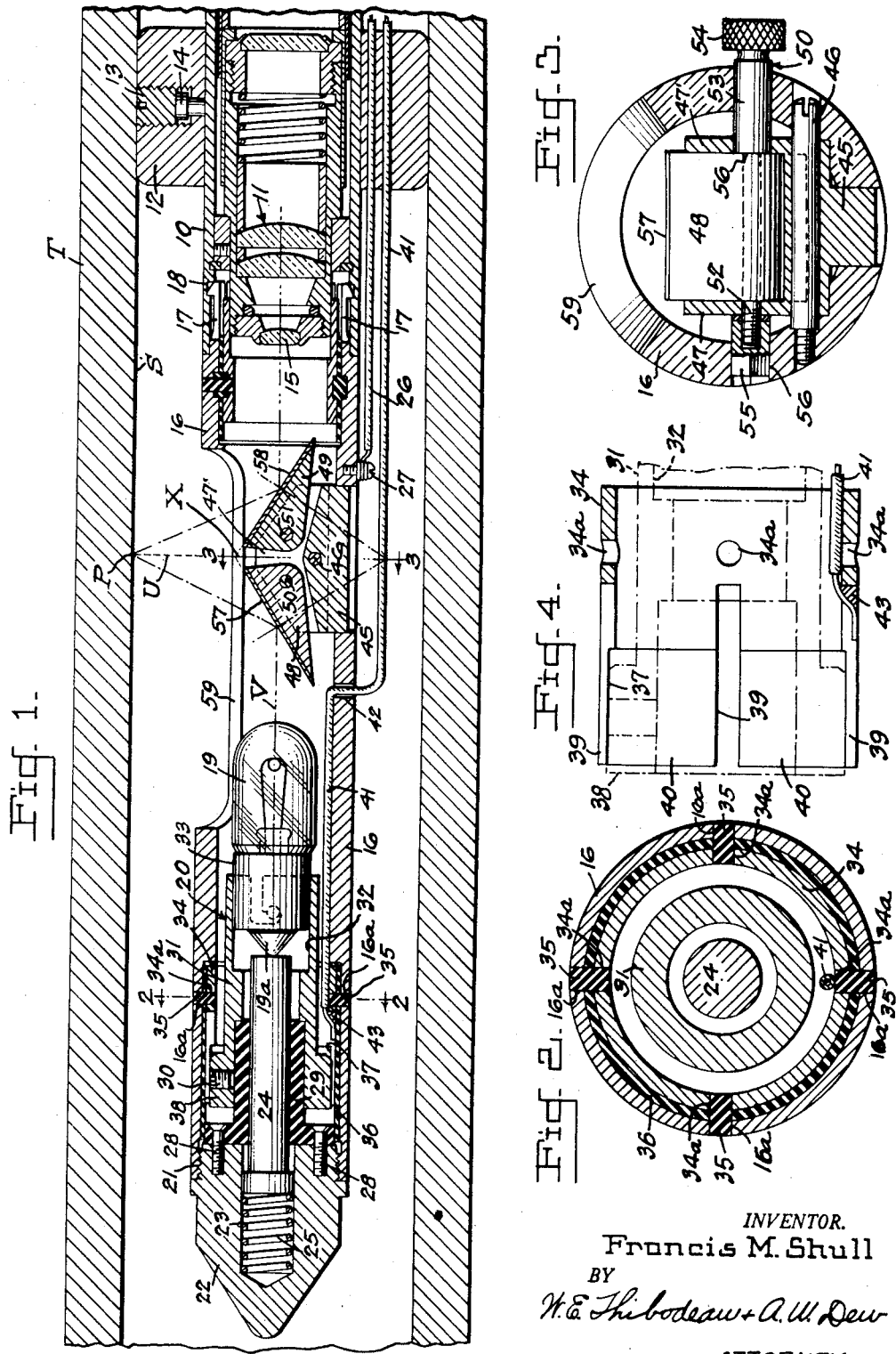

2,899,856

ILLUMINATING HEAD FOR BORE INSPECTION DEVICE

Francis M. Shull, Rochester, N.Y., assignor, by mesne assignments, to the United States of America as represented by the Secretary of the Army Application June 15, 1954, Serial No. 437,018

3 Claims. (Cl. 88—14)

This invention is an optical device for minutely inspecting the interior surfaces of pipes, gun bores or the like.

It is common in optical devices for examining the interior surface of a tube to arrange a lamp and a reflecting surface to project an image of a portion of the interior surface into the central field of an optical system. The remaining field of view includes a band around the full inner circumference of the tube. Because the surface of the inner circumference observed is highly specular, it is difficult to arrange the lamp and mirror so that the area seen in the central field will appear as well lighted as the same area seen in the peripheral field. Applicant's addition of a second mirror and symmetrical location of the lamp and the entrance pupil of the optical system in axial and opposite positions about the mirrors accomplishes specular lighting for both aspects of the area to be examined and increased illumination in the central field.

An object of the invention is to provide a device in which rays from a light source are directed to a predetermined area of the interior surface to be inspected and an image of the additionally illuminated area is projected into the central field of an optical system.

Another object of the invention is to provide a reflecting surface for directing a light beam from a light source to a restricted area of a surface to be inspected and a second reflecting surface for projecting an image of the illuminated surface into the optical system.

Another object of the invention is to provide means for adapting the device for use in tubes having various sized bores.

Other objects and advantages will be apparent from the following detailed description and the accompanying drawings in which:

Figure 1 is a longitudinal sectional view of the bore inspection device herein disclosed, in operative position inside a tube.

Figure 2 is a transverse sectional view of the device, taken on the line 2—2 of Figure 1 and looking in the direction of the arrows.

Figure 3 is a transverse sectional view of the device, taken on the line 3—3 of Figure 1 and looking in the direction of the arrows, and Figure 4 is a detail sectional view of a part of a lamp socket used with the present invention.

Referring now to the drawings wherein, for the purpose of illustration, is shown one form of the invention. The reference character T indicates any type of tube which it is desired to inspect. The inner surface S of the tube may be smooth or rifled, as would be the case if the tube were a gun barrel.

A cylindrical casing 10 of any desired length houses an optical system 11. Removably secured externally of the casing 10 any desired number of centering rings 12 may be positioned in spaced relationship. A set screw 13 impinges on a headed plug 14 of suitable composition to prevent damage to the casing 10 when the set screw is drawn up. The rings 12 have a sliding and rotating fit in the bore S and maintain the optical system in coaxial relationship therewith. It will be understood that rings having various diametrical dimensions are interchangeable for use with different sized bores.

A cylindrical housing 16 has one end diametrically reduced and longitudinally slotted to form resilient fingers 17 having a bead at their free ends for engagement with an annular internal groove 18 near the adjacent open end of the casing 10. The fingers 17 are insertable into the open end of casing 10 and engage internal groove 18 of the housing to provide an easy means of assembly and disassembly.

The distal end of the housing 16 supports an electric lamp 19 and lamp socket 20. Positioned in such distal end and secured thereto by screw threads 21 is a plug 22 having an axially disposed bore 23 in which the enlarged head of a plunger 24 slides. The plunger serves as one electrode for supplying electrical energy to the central contact 19a of the lamp and is urged into engagement therewith by a spring element 25. A conductor 26 for electrical energy from a source, not shown, is connected to the housing 16 by the terminal screw 27, from which point the electrical energy traverses the housing wall to the plug 22 and thence to the plunger 24 and the central contact element on the lamp. Secured to the plug 22 by any suitable means such as screws 28 is an axially disposed plunger guide 29 of insulating material. Surrounding the plunger guide and secured thereto by a set screw 30 is a first sleeve member 31 having an end bore 32 in which the lamp base 33 is seated and held by the usual pin and bayonet slot. The sleeve member is counterbored to embrace the plunger guide and permit free movement of the plunger. A second sleeve member 34, surrounds the first sleeve member 31 and is fixed to the housing 16 by plugs 35 of nylon or other insulating material insertable through radially aligned openings 16a in the housing 16 and openings 34a in the second sleeve 34. The sleeve 34 is spaced from the housing by a thickness of insulating material 36 and has a bore 37 for snugly embracing the enlarged end 38 of the sleeve 31. Circumferentially spaced around the sleeve 34 are longitudinal slots 39 forming spring fingers 40 to insure close contact with the enlarged end of sleeve 31. A second conductor 41 for electrical energy is passed inside the housing 16 through an opening 42 and brought to the interior surface of the second sleeve 34 where it is soldered as at 43. The return path of electrical energy is from lamp base 33 to the first sleeve 31, the fingers 40 of the second sleeve 34, the soldered connection 43 and the conductor 41 back to the source. The first sleeve 31 therefore becomes the second electrode in the lamp socket.

A bracket 45 is positioned within housing 16 intermediate the lamp 19 and an objective lens 15 of the optical system and is secured therein by a screw 46. Parallel arms 47 and 47' rise from the bracket 45 and pivotally support a first mounting block 48 and a second mounting block 49 on pins 50 and 51 respectively. The pins are identical and each has a reduced portion 52 journalled in one arm 47 and an enlarged end 53 journalled in the other arm 47' of the bracket 45 (see Figure 3). The end 53 extends through housing 16 and has a knurled head 54, and the end portion 52 is screw threadedly received in a rectangularly shaped nut 55 received in a similarly shaped opening 56 in the housing wall. A shoulder 56 on the enlarged end bears against its respective block and causes the block to impinge against the arm 47 when the pin is screwed into its nut to hold the block in a desired position. A first light reflector 57 of any suitable material is secured to the face of block 48 adjacent the lamp 19 and a second reflector 58 is secured to the face of block 49 adjacent the objective lens 15. A portion of the cylindrical housing 16 is removed as at 59 to permit light rays from lamp 19 to reach the inner surface S of the tube T.

The reflectors 57 and 58 are symmetrically spaced about a reference plane U normal to the coaxial longitudinal axes V of the tube T and the housing 16. The reflector surfaces are equally and oppositely inclined from the reference plane U and lie in planes having a common boundary line X of intersection in the reference plane. The reflectors are always adjusted to positions in which, the angles of incidence and reflection being equal, a beam of light from the lamp 19 will be reflected from the first reflector surface 57 to a point P on the inner surface S of the tube and in a similar manner light is collected from the point P and directed by the second reflector surface 58 to the optical system.

The operation of the device is as follows:

Centering rings 12 of a size to fit the bore, of a tube to be inspected, are secured to the casing 10 at any spaced distance required to maintain coaxial alignment of the assembled device and tube bore. The pin 50 is rotated to loosen the reflector block 48 which is then rotated until the reflector 57 directs a beam of light to the point P at the intersection of the reference line U and the inner surface S of the tube. The pin 50 is then rotated to clamp the block and reflector securely in such position. The operation is repeated for adjusting the reflector 58 and when the point P appears centrally and axially of the optical system the pin 51 is rotated to clamp the block 49 and reflector 58 in such position. The device can then be reciprocated and rotated within the bore for complete inspection thereof.

While I have disclosed a form of the invention presently preferred by me, various changes and modifications will occur to those skilled in the art after a study of the present disclosure. Hence the disclosure is to be taken in an illustrative rather than a limiting sense; and it is my desire and intention to reserve all modifications falling within the scope of the subjoined claims.

Having now fully disclosed the invention, what I claim and desire to secure by Letters Patent is:

1. In a gun bore inspection instrument adapted for insertion in a gun tube, a cylindrical housing having a portion of its periphery cut away to form a viewing aperture, a lens system in one end of said housing, a source of illumination facing the lens system removably attached to the opposite end of the housing and projecting into said aperture, mirrored mounting blocks positioned back to back in said housing between the lens system and said source of illumination and within said aperture, means for adjusting the mounting blocks until the mirrors are at equal angles with the horizontal axis of the housing, centering means, sized to fit the bore, externally secured to the housing at the lens end and adapted to permit freedom of movement of the housing within the bore of the gun tube for a complete inspection thereof.

2. In a gun bore inspection instrument adapted for insertion in a gun tube, a cylindrical housing having a portion of its periphery cut away to form a viewing aperture within which is an optical viewing system, comprising a lens system in one end of said housing and adjacent to said aperture, a source of illumination facing the lens system removably attached to the opposite end of said housing and projecting into said aperture, mirrored mounting blocks positioned back to back within the aperture in said housing between the lens system and the source of illumination, means for adjusting the mounting blocks until the mirrors are at equal angles with the horizontal axis of the housing, thereafter maintaining the lens, the light, and the mirrors in the same fixed relationship with each other to permit the surface inspected to be subjected to both direct and reflected light rays, centering means sized to fit the bore externally secured to the housing at the lens end and adapted to permit freedom of movement of the housing within the bore for a complete inspection thereof.

3. In a gun bore inspection instrument adapted for insertion in a gun tube, a cylindrical housing having a portion of its periphery cut away to form a viewing aperture within which is an optical viewing system, comprising a lens system in one end of said housing and adjacent to the aperture, a source of illumination facing the lens system removably attached to the opposite end of said housing and projecting into said aperture, mirrored mounting blocks positioned back to back within the aperture in said housing midway between the lens system and the source of illumination, means for adjusting the mounting blocks until the reflected rays from each mirror intersect on the gun tube at a point equidistant from each mirror, and thereafter maintaining the lens, the light and the mirrors in fixed relationship so that the central field of the optical system will coincide with the central axis of the housing.

References Cited in the file of this patent

UNITED STATES PATENTS

| | | |
|---|---|---|
| 1,760,208 | Pfeiffer et al. | May 27, 1930 |
| 1,874,571 | Mitchell | Aug. 30, 1932 |

FOREIGN PATENTS

| | | |
|---|---|---|
| 110,148 | Switzerland | June 5, 1924 |
| 486,138 | Germany | Nov. 9, 1929 |
| 647,185 | France | Nov. 21, 1928 |